United States Patent
Chandrasekaran et al.

(10) Patent No.: US 12,298,993 B2
(45) Date of Patent: May 13, 2025

(54) METADATA SYNCHRONIZATION FOR CROSS SYSTEM DATA CURATION

(71) Applicant: SAP SE, Walldorf (DE)

(72) Inventors: Vengateswaran Chandrasekaran, Trichy (IN); Venkatesh Iyengar, Bangalore (IN); Heshang Majmudar, Santa Clara, CA (US); Sriram Narasimhan, Pleasanton, CA (US)

(73) Assignee: SAP SE, Walldorf (DE)

( * ) Notice: Subject to any disclaimer, the term of this patent is extended or adjusted under 35 U.S.C. 154(b) by 587 days.

(21) Appl. No.: 17/358,972

(22) Filed: Jun. 25, 2021

(65) Prior Publication Data

US 2022/0414112 A1    Dec. 29, 2022

(51) Int. Cl.
*G06F 16/25* (2019.01)
*G06F 16/21* (2019.01)
*G06F 16/26* (2019.01)
*G06F 16/27* (2019.01)

(52) U.S. Cl.
CPC ......... *G06F 16/254* (2019.01); *G06F 16/213* (2019.01); *G06F 16/26* (2019.01); *G06F 16/27* (2019.01)

(58) Field of Classification Search
CPC ...... G06F 16/254; G06F 16/213; G06F 16/26; G06F 16/27
See application file for complete search history.

(56) References Cited

U.S. PATENT DOCUMENTS

| | | | |
|---|---|---|---|
| 9,659,040 B1* | 5/2017 | Bellingan | G06F 16/213 |
| 10,083,472 B1* | 9/2018 | Schroder | G06Q 30/0623 |
| 10,740,324 B1* | 8/2020 | Pandari | G06F 16/24561 |
| 2017/0109676 A1* | 4/2017 | Marcu | G06F 11/368 |
| 2018/0096043 A1* | 4/2018 | Ledbetter | G06F 16/27 |
| 2018/0365278 A1* | 12/2018 | Klöhn | G06F 16/51 |
| 2020/0125540 A1* | 4/2020 | Thatte | G06F 16/258 |
| 2022/0084640 A1* | 3/2022 | Lohman | G16B 20/00 |
| 2022/0138168 A1* | 5/2022 | Veselova | G06F 16/258 |
| | | | 707/692 |
| 2022/0300502 A1* | 9/2022 | Enver | G06F 16/2465 |

* cited by examiner

*Primary Examiner* — Etienne P Leroux
*Assistant Examiner* — Dara J Glasser
(74) *Attorney, Agent, or Firm* — Mintz Levin Cohn Ferris Glovsky and Popeo, P.C.

(57) ABSTRACT

A method may include receiving, at a data lake platform, a packet including a metadata corresponding to a data schema of a source system. A change in the data schema of the source system may be detected based on a first checksum of the metadata and a second checksum of a previous version of the metadata. In response to detecting the change in the data schema of the source system, the metadata may be sent to a target system to enable the target system to perform, based on the data schema of the source system, a task operating on a data from the source system. The task may include reporting, visualization, advanced analytics, and/or machine learning. Related systems and computer program products are also provided.

20 Claims, 15 Drawing Sheets

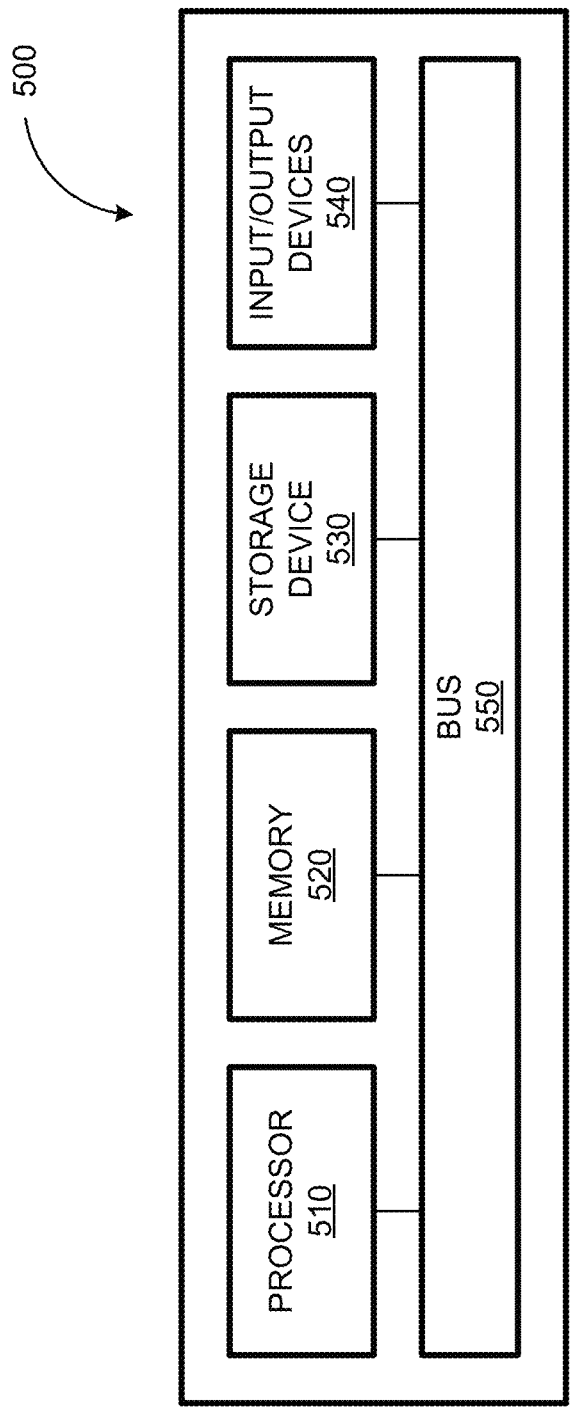

METADATA SYNCHRONIZATION FOR CROSS SYSTEM DATA CURATION

TECHNICAL FIELD

The subject matter described herein relates generally to data curation and more specifically to the synchronization of metadata for curating data across multiple source systems.

BACKGROUND

A data lake is a type of data repository configured to store data in a natural or raw format such as, for example, files, binary large objects (BLOBs), and/or the like. Data stored in the data lake may be made available for a variety of applications including, for example, reporting, visualization, advanced analytics, and machine learning. For example, data from the data lake may be used to as training data for training one or more machine learning models to perform a variety of cognitive tasks such as object identification, natural language processing, information retrieval, and speech recognition. A deep learning model such as, for example, a neural network, may be trained to perform a classification task by at least assigning input samples to one or more categories. The deep learning model may be trained based on training data, which may include data from the data lake that has been labeled in accordance with the known category membership of each sample included in the training data. Alternatively and/or additionally, data from the data lake may be used to train the deep learning model to perform a regression task in which the deep learning model predicts, based at least on variations in one or more independent variables, corresponding changes in one or more dependent variables.

SUMMARY

Systems, methods, and articles of manufacture, including computer program products, are provided for metadata synchronization. In some example embodiments, there is provided a system that includes at least one processor and at least one memory. The at least one memory may include program code that provides operations when executed by the at least one processor. The operations may include: receiving, at a data lake platform, a packet including a metadata corresponding to a data schema of a source system; detecting, based at least on a first checksum of the metadata and a second checksum of a previous version of the metadata, a change in the data schema of the source system; and in response to detecting the change in the data schema of the source system, sending the metadata to a target system to enable the target system to perform, based at least on the data schema of the source system, a task operating on a data from the source system.

In some variations, one or more features disclosed herein including the following features can optionally be included in any feasible combination. The data from the source system may be associated with at least one datatype. The data schema may define a quantity and a content of fields forming the at least one datatype.

In some variations, the first checksum and the second checksum may be computed by at least applying, to a value associated with one or more fields of the at least one datatype, a hash algorithm.

In some variations, the value may include a name, a type, and/or a length of the one or more fields.

In some variations, the one or more fields may include one or more reportable fields preconfigured in a markup language of the source system.

In some variations, the one or more reportable fields may be identified by a whitelist of reportable fields and/or a blacklist of non-reportable fields.

In some variations, the previous version of the metadata may include a historical data from prior to an onboarding of a tenant associated with the metadata.

In some variations, the source system may be associated with an event stream providing a constant flow of the data from the source system. The packet may be received by at least removing the packet from the event stream.

In some variations, the metadata may be stored in a raw data store and undergoes an extract, transform, and load process in order to be sent to the target system.

In some variations, the task at the target system may include reporting, visualization, advanced analytics, and/or machine learning.

In another aspect, there is provided a method for metadata synchronization. The method may include: receiving, at a data lake platform, a packet including a metadata corresponding to a data schema of a source system; detecting, based at least on a first checksum of the metadata and a second checksum of a previous version of the metadata, a change in the data schema of the source system; and in response to detecting the change in the data schema of the source system, sending the metadata to a target system to enable the target system to perform, based at least on the data schema of the source system, a task operating on a data from the source system.

In some variations, one or more features disclosed herein including the following features can optionally be included in any feasible combination. The data from the source system may be associated with at least one datatype. The data schema may define a quantity and a content of fields forming the at least one datatype.

In some variations, the method may further include computing the first checksum and the second checksum by at least applying, to a value associated with one or more fields of the at least one datatype, a hash algorithm.

In some variations, the value may include a name, a type, and/or a length of the one or more fields.

In some variations, the one or more fields may include one or more reportable fields preconfigured in a markup language of the source system.

In some variations, the one or more reportable fields may be identified by a whitelist of reportable fields and/or a blacklist of non-reportable fields.

In some variations, the previous version of the metadata may include a historical data from prior to an onboarding of a tenant associated with the metadata.

In some variations, the source system may be associated with an event stream providing a constant flow of the data from the source system. The packet may be received by at least removing the packet from the event stream.

In some variations, the metadata may be stored in a raw data store and undergoes an extract, transform, and load process in order to be sent to the target system.

In another aspect, there is provided a computer program product including a non-transitory computer readable medium storing instructions. The instructions may cause operations may executed by at least one data processor. The operations may include: receiving, at a data lake platform, a packet including a metadata corresponding to a data schema of a source system; detecting, based at least on a first checksum of the metadata and a second checksum of a previous version of the metadata, a change in the data schema of the source system; and in response to detecting the change in the data schema of the source system, sending the metadata to a target system to enable the target system to perform, based at least on the data schema of the source system, a task operating on a data from the source system.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 depicts a block diagram illustrating a computing system, in accordance with some example embodiments; and When practical, similar reference numbers denote similar structures, features, or elements.

DETAILED DESCRIPTION

Data stored in a data lake may be used for a variety of applications. For example, the data lake may ingest data from a source system before providing that data to a target system for a task such as reporting, visualization, advanced analytics, machine learning, and/or the like. At least a portion of the data from the source system may be structured data organized in accordance with a schema (or other data model). The schema may define one or more datatypes, which may be represented as tables in the case of a relational database, including by specifying the quantity, type, and contents of the fields forming each datatype. Furthermore, the schema may specify the relationships that may exist between two or more different datatypes. Thus, the target system may rely on the data schema from the source system in order to perform the task operating on the data from the source system.

The data lake may interface with a source system and a target system having disparate data schemas. Moreover, the schema of the data from the source system may undergo various changes over time. Nevertheless, the source system may lack a versioning system to track the changes in its data schema. This may often be the case when the source system is a legacy system that lack the resources to implement version control. As such, in some example embodiments, the data lake may include a metadata controller configured to detect changes in the data schema of the source system. For example, the metadata controller may determine, based at least on a first checksum of the data schema from a first time $t_1$ and a second checksum of the data schema from a second time $t_2$, that the data schema of the source system has undergone one or more changes between the first time $t_1$ and the second time $t_2$. In response to detecting a change in the data schema of the source system, the metadata controller may provide a corresponding update to the target system such that the target system is able to operate on the data from the source system to perform one or more tasks such as reporting, visualization, advanced analytics, and machine learning.

Figure 1A:
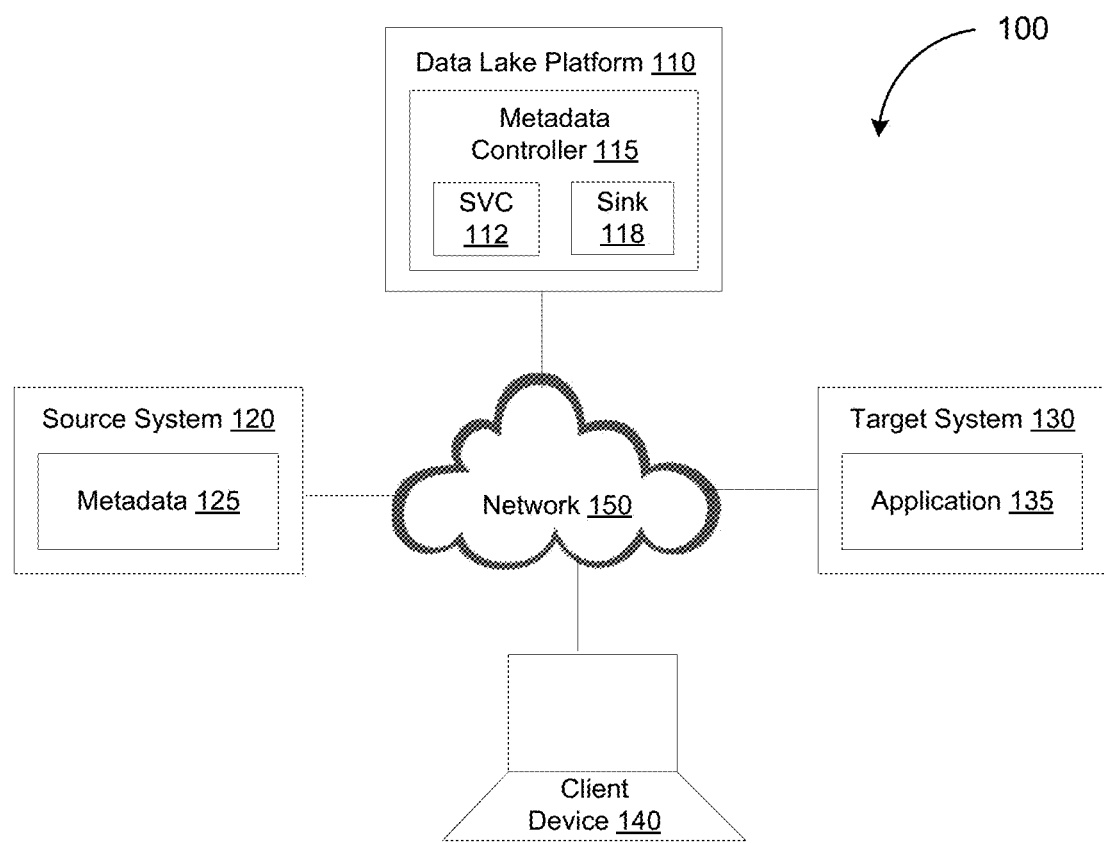
FIG. 1A depicts a system diagram illustrating an example of a data lake system, in accordance with some example embodiments.

FIG. 1A depicts a system diagram illustrating an example of a data lake system 100, in accordance with some example embodiments. Referring to FIG. 1A, the data lake system 100 may include a data lake platform 110 including a metadata controller 115, a source system 120, a target system 130, and a client device 140. The data lake platform 110, the source system 120, the target system 130, and the client device 140 may be communicatively coupled via a network 150. The client device 140 may be a processor-based device including, for example, a smartphone, a tablet computer, a wearable apparatus, a virtual assistant, an Internet-of-Things (IoT) appliance, and/or the like. The network 150 may be any wired network and/or a wireless network including, for example, a wide area network (WAN), a local area network (LAN), a virtual local area network (VLAN), a public land mobile network (PLMN), the Internet, and/or the like.

The data lake platform 110 may ingest data from the source system 120 and provide the data to the target system 130 for an application 135. The application 135 may be associated with one or more tasks such as, for example, reporting, visualization, advanced analytics, machine learning, and/or the like. At least a portion of the data from the source system 120 may be structured data organized in accordance with a data schema. The data schema may include, for example, a metadata 125 defining one or more datatypes including by specifying the quantity and contents of the fields forming each datatype. The metadata 125 may further specify the various relationship that may exist between different datatypes. As such, the metadata 125 corresponding to the data schema of the source system 120 may be shared with the target system 130 in order for the target system 130 to perform the one or more tasks associated with the application 135. The metadata 125 may be associated with a variety of formats including, for example, JavaScript Object Notation (JSON), Extensible Markup Language (XML), and/or the like. Accordingly, the data schema of the source system 120 may be shared with the target system 130 by at least sending, to the target system 130, one or more documents containing the metadata 125, for example, in a JavaScript Object Notation (JSON) format, an Extensible Markup Language (XML) format, and/or the like.

The data schema at the source system 120 may undergo one or more changes, for example, due to the execution of one or more data definition language (DDL) transactions from the client device 140. For example, the data schema of the source system 120 may undergo one or more changes between the first time $t_1$ and the second time $t_2$. Nevertheless, the source system 120 may lack a native version control for tracking the changes to the data schema of the source system 120. Accordingly, in some example embodiments, the metadata controller 115 at the data lake platform 110 may be configured to detect changes in the data schema of the source system 120. For instance, the metadata controller 115 may determine, based at least on a first checksum of the data schema from the first time $t_1$ and a second checksum of the schema from the second time $t_2$, that the data schema of the source system 120 has undergone one or more changes between the first time $t_1$ and the second time $t_2$. The first checksum and the second checksum may be computed based on the metadata 125 including, for example, the values associated with the description, type, length, and/or the like of each field included in the metadata 125. In response to detecting the one or more changes in the data schema of the source system 120, the metadata controller 115 may provide a corresponding update to the target system 130 such that the target system 130 is able to perform the one or more tasks associated with the application 135.

Figure 1B:
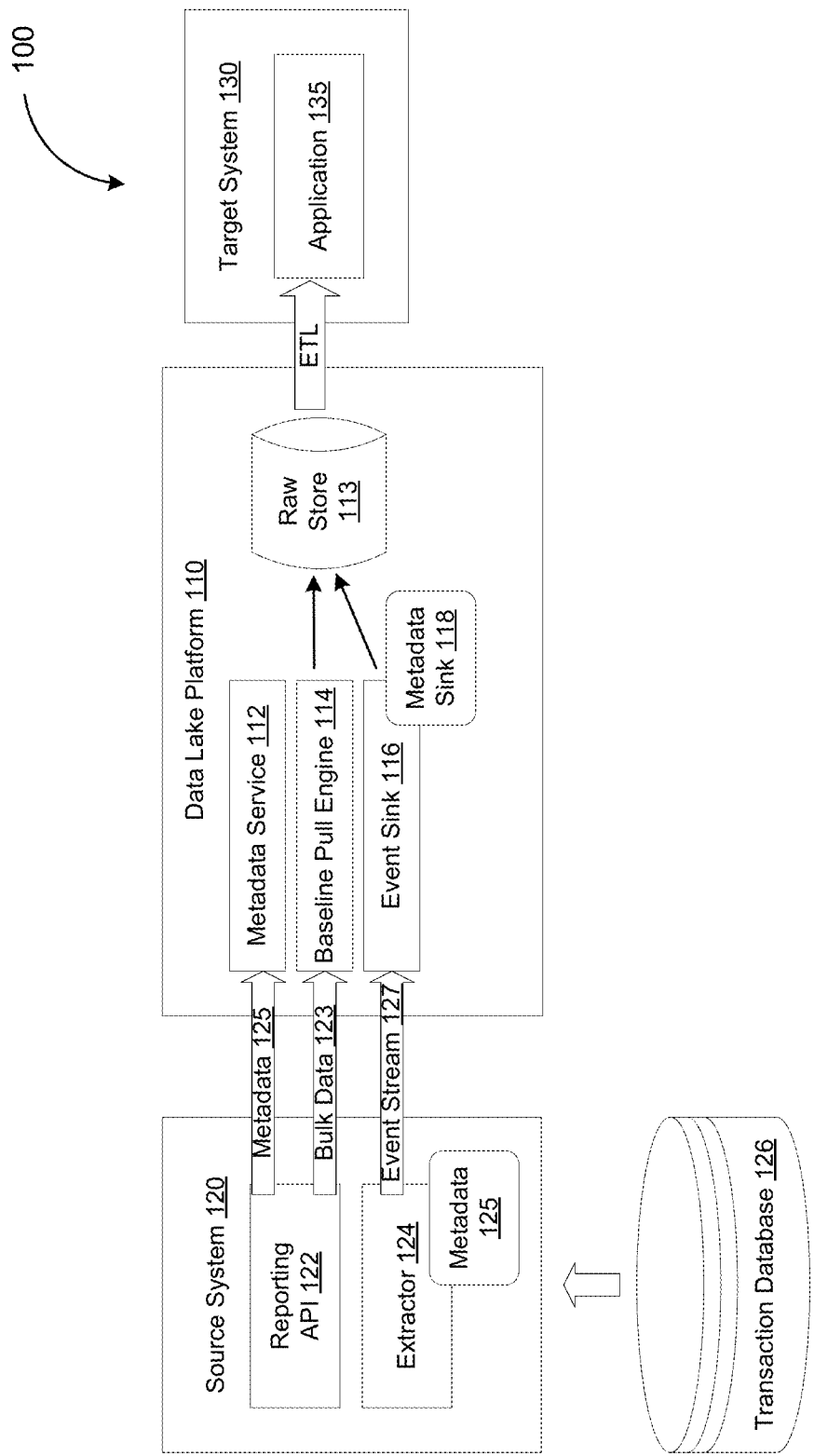
FIG. 1B depicts a schematic diagram illustrating an example of a data lake system, in accordance with some example embodiments.

FIG. 1B depicts a schematic diagram illustrating an example of the data lake system 100, in accordance with some example embodiments. Referring to FIGS. 1A-B, the source system 120 may include a reporting application programming interface (API) 122 configured to send the metadata 125 to a metadata service 112 at the data lake platform 110 and a bulk data 123 to a baseline pull engine 114 at the data lake platform 110. Furthermore, the source system 120 may include an extractor 124 configured to send the metadata 125 to an event sink 116 at the data platform 110. The data lake platform 110 may include a raw store 113 configured to store raw data from the baseline pull engine 114 and the event sink 116. As shown in FIG. 1B, at least a portion of the raw data from the raw store 113 may undergo an extract, transform, and load (ETL) process in order to be used by the application 135 at the target system 130.

Figure 2A:
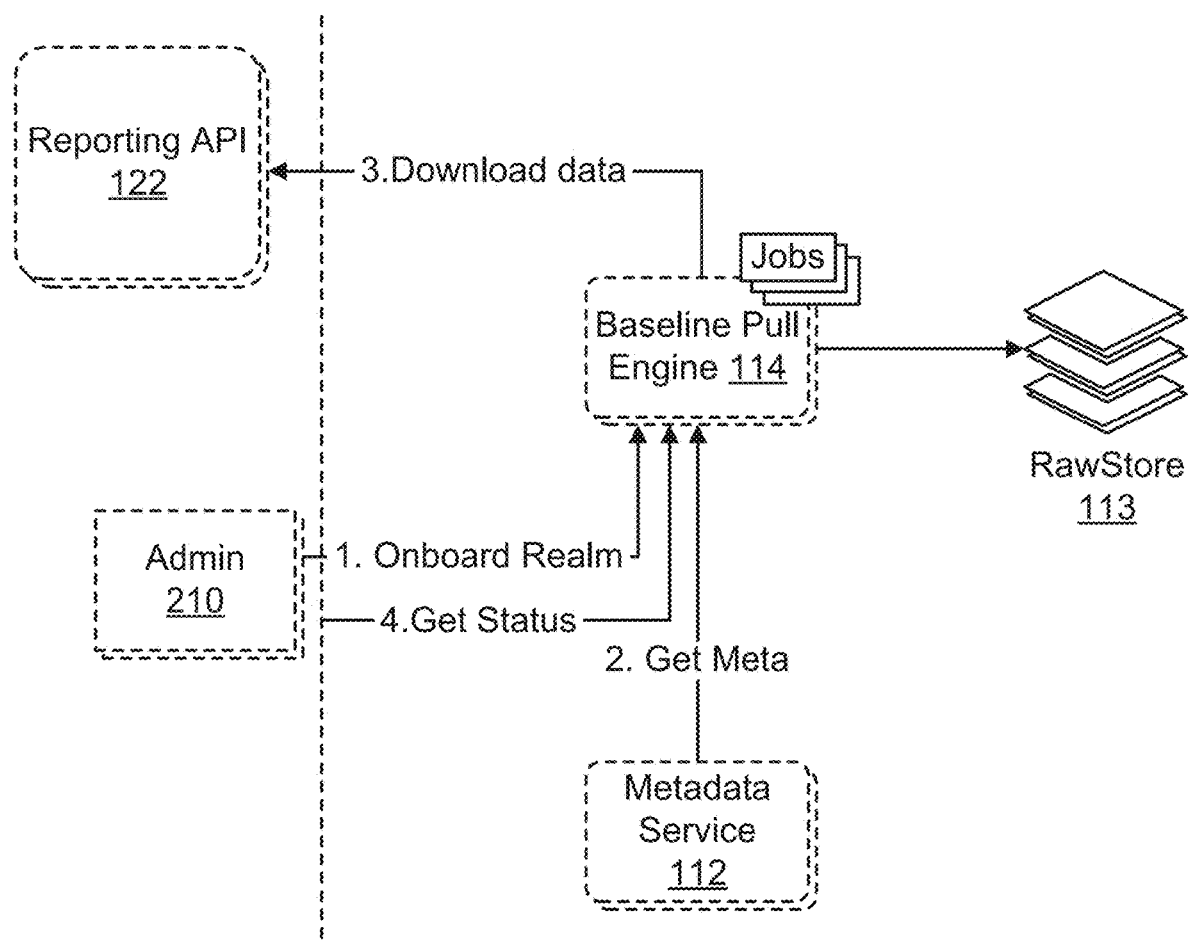
FIG. 2A depicts a schematic diagram illustrating an example of a process for acquiring historical data through a reporting application programming interface, in accordance with some example embodiments.

FIG. 2A depicts a schematic diagram illustrating an example of a process for the baseline pull engine 114 to acquire, from the source system 120, a historical data through the reporting application programming interface 122. The data pulled from the source system 120 may include one or more reportable fields such as those required for reporting for a particular datatype as preconfigured in a markup language of the source system 120. Upon onboarding a tenant, for example, as directed by an administrator 210, the baseline pull engine 114 may pull historical records associated with the datatype specified for reporting in the metadata service 122. These historical records may include data up until the time of the onboarding. The data may be pulled via the reporting application programming interface 122 in one or more batches before being written to the raw store 113, for example, based on a partition strategy at the raw store 113.

Figure 2B:
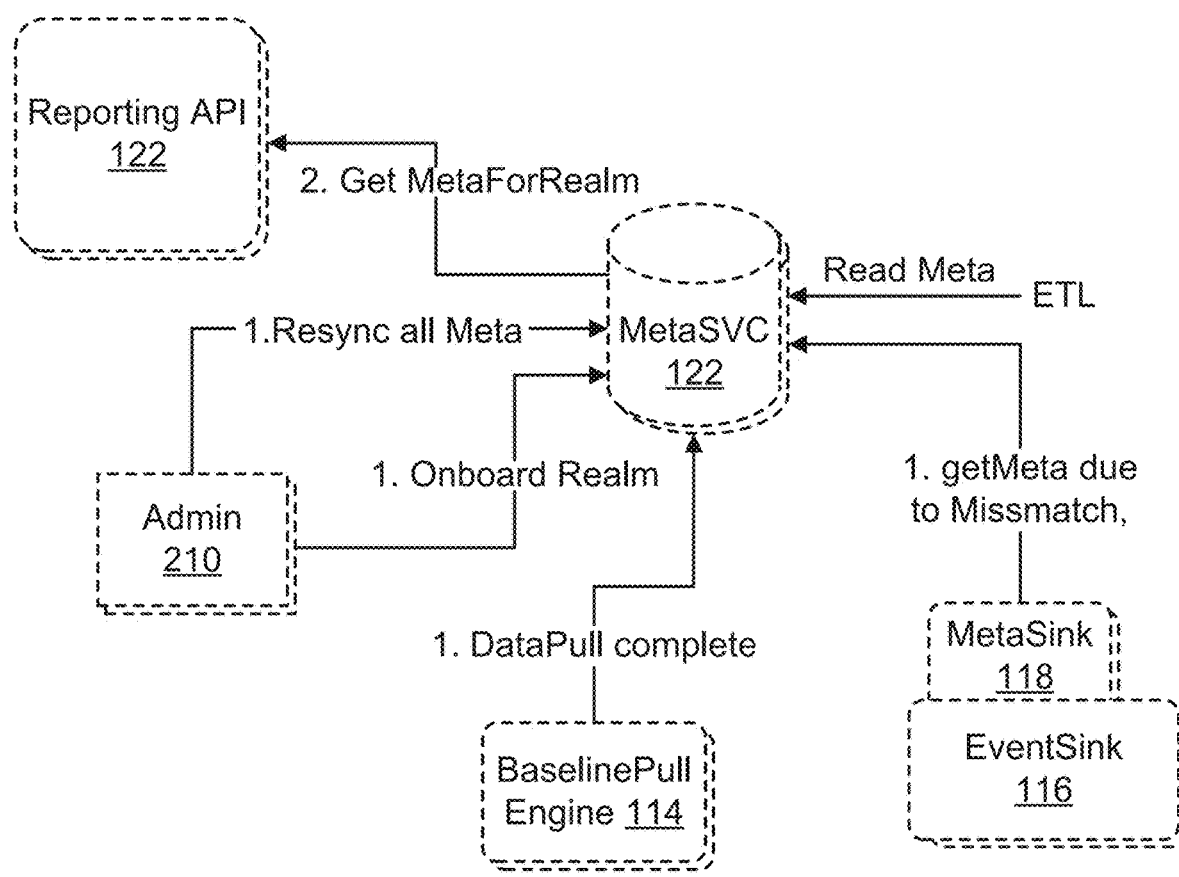
FIG. 2B depicts a schematic diagram illustrating an example of a process for synchronizing metadata between a data lake platform and a source system, in accordance with some example embodiments.

FIG. 2B depicts a schematic diagram illustrating an example of a process for synchronizing metadata between the data lake platform 110 and the source system 120, in accordance with some example embodiments. Referring to FIG. 2B, the metadata sink 118, which is part of the metadata controller 115, may be configured to detect changes in the metadata 125 corresponding to the data schema of the source system 120. For example, as noted, changes made to the metadata 125 between a first time $t_1$ and a second time $t_2$ may be detected based on at least on based at least on a first checksum of the data schema from the first time $t_1$ and a second checksum of the data schema from the second time $t_2$. If the metadata sink 118 detects one or more changes in the metadata 125 of the source system 120, the metadata sink 118 may notify the metadata service 112 to acquire the changed metadata 125 from the source system 120. For example, the metadata service 112 may be configured to acquire the preconfigured reporting fields, dynamic changes associated with flexible fields, and the multilingual labels associated with each field.

Changes in the data schema of the source system 120 and the corresponding metadata 125 may result from the execution of one or more transactions at the source system 120. For example, the one or more transactions may modify the flexible fields of the data schema. In some example embodiments, in response to the extractor 124 at the source system 120 may be configured to determine if a transaction at the source system 120 resulted in any changes in the metadata 125 including, for example, changes in one or more reportable fields of a particular datatype. In the event the extractor 124 detects one or more such changes, the extractor 124 may be further configured to extract the one or more reportable fields of the datatype, such as those specified by the markup language of the source system 120. The extractor 124 may make use of the datatype that is cached for a particular session. However, in the event the datatype is not cached, the extractor 124 may retrieve the corresponding data from another database by executing one or more query language statements.

Figure 2C:
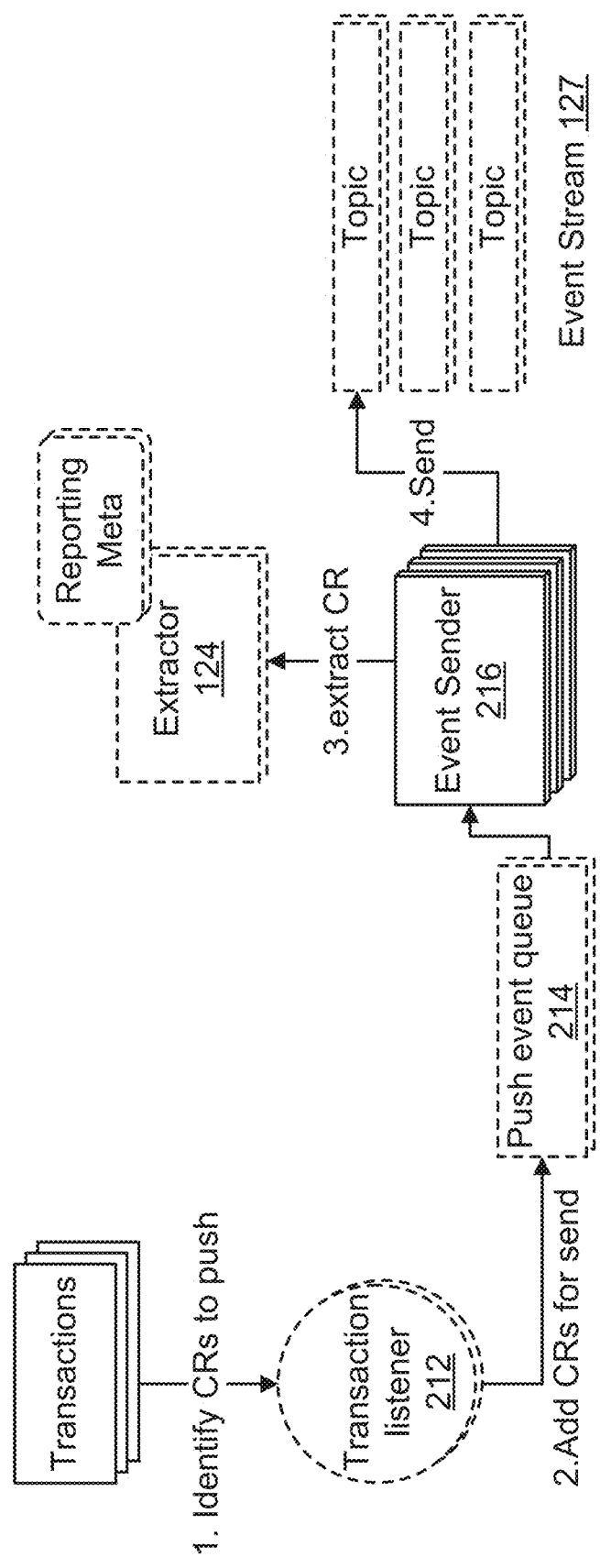
FIG. 2C depicts a schematic diagram illustrating an example of the process for extracting and sharing metadata, in accordance with some example embodiments.

FIG. 2C depicts a schematic diagram illustrating an example of the process for extracting and sharing metadata, in accordance with some example embodiments. As shown in FIG. 2C, a transaction listener 212 may, upon detecting a transaction at the source system 120, push the transaction to a push event queue 216. An event sender 216 may send the transaction to the extractor 124 which, as noted, may extract one or more reportable fields. The event sender 216 may send the reportable fields to the data lake platform 110 including by inserting the reportable fields as an event in an event stream 127. The event stream 127 may hold streaming data (or a constant flow of data) that is processed in real time as it is delivered to the target system 130. Thus, the event sender 216 may be configured to push a below-threshold quantity of events to the event stream 127 to avoid overwhelming resources at the source system 120 and/or the data lake platform 110. The quantity of time elapsed during the extraction of the reportable fields and the pushing of the corresponding event may be minimized to further minimize the impact to system resources.

Figure 2D:
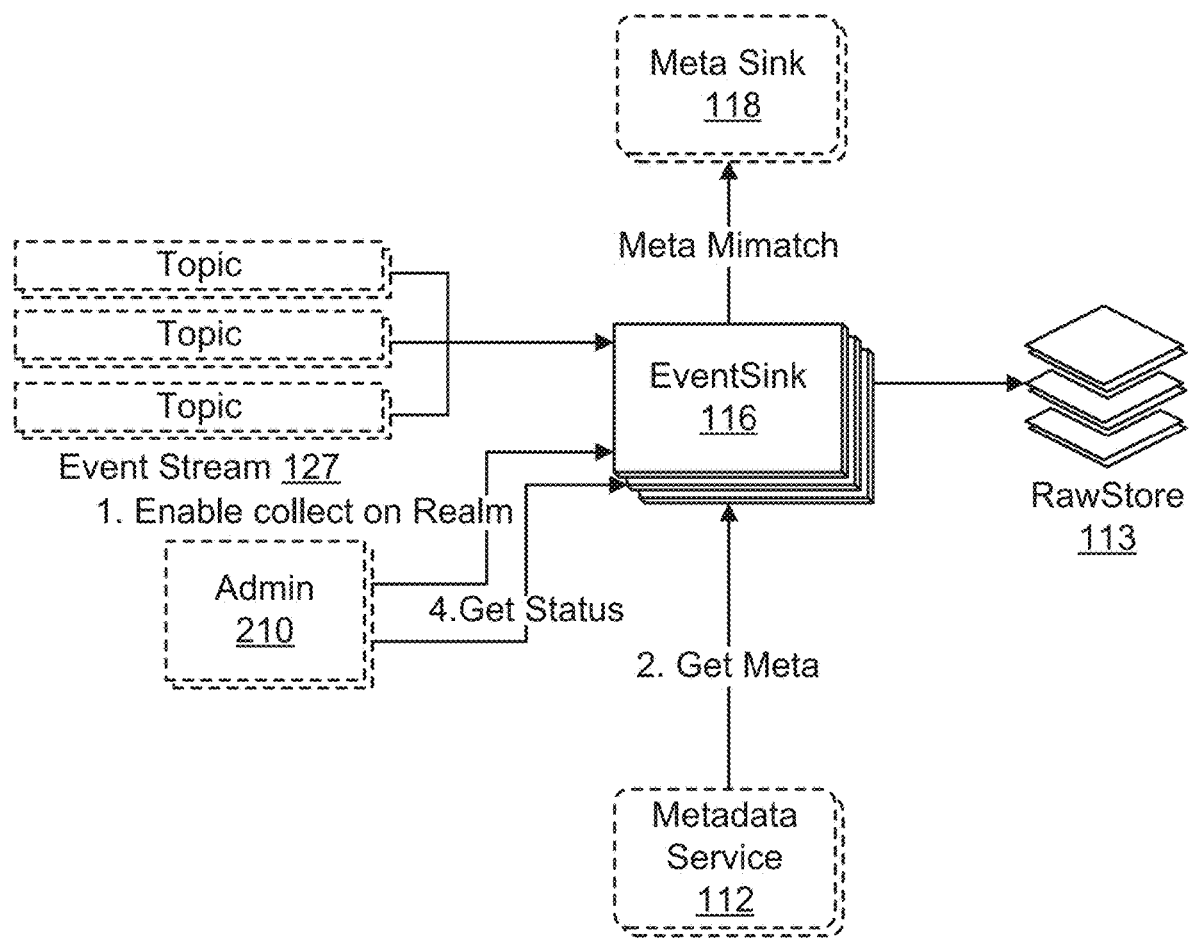
FIG. 2D depicts a schematic diagram illustrating an example of a process for synchronization between an event sink, an event stream, and a raw store, in accordance with some example embodiments.

In some example embodiments, the event sink 116 may consume events from the event stream 127 including by listening for the addition of events to the event stream 127 and synchronizing the contents of the event stream 127 with the raw store 113. A schematic diagram depicting an example of this process is shown in FIG. 2D. The raw store 113 may be provide file storage on hyper scaler. For example, the raw store 113 may provide a file system to which the metadata 125 may be written in a column oriented data storage format such as Parquet (or another data storage format). The event sink 116 may monitor an event consumption rate and a backlog rate in order to prevent excessive lag time. For instance, the event sink 116 may raise an alert to trigger a scaling of the resources at the data lake platform 110 if the event consumption rate and/or the backlog rate observed by the event sink 116 fail to meet one or more thresholds.

Figure 3A:
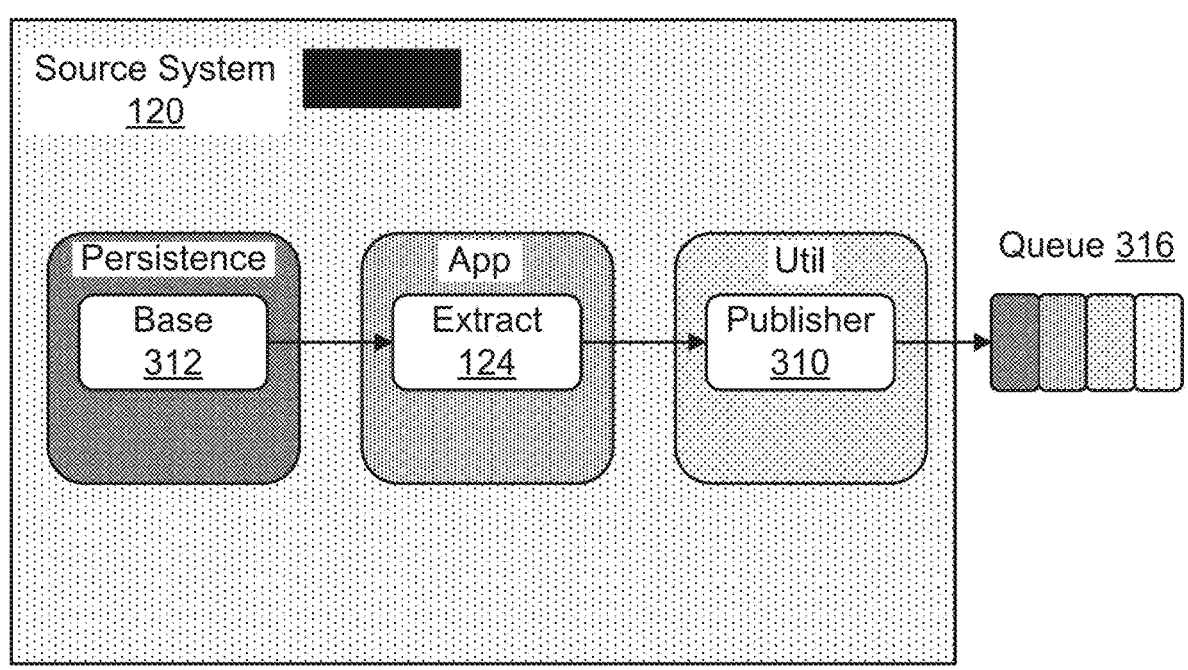
FIG. 3A depicts a schematic diagram illustrating an example of a source system, in accordance with some example embodiments.
Figure 3B:
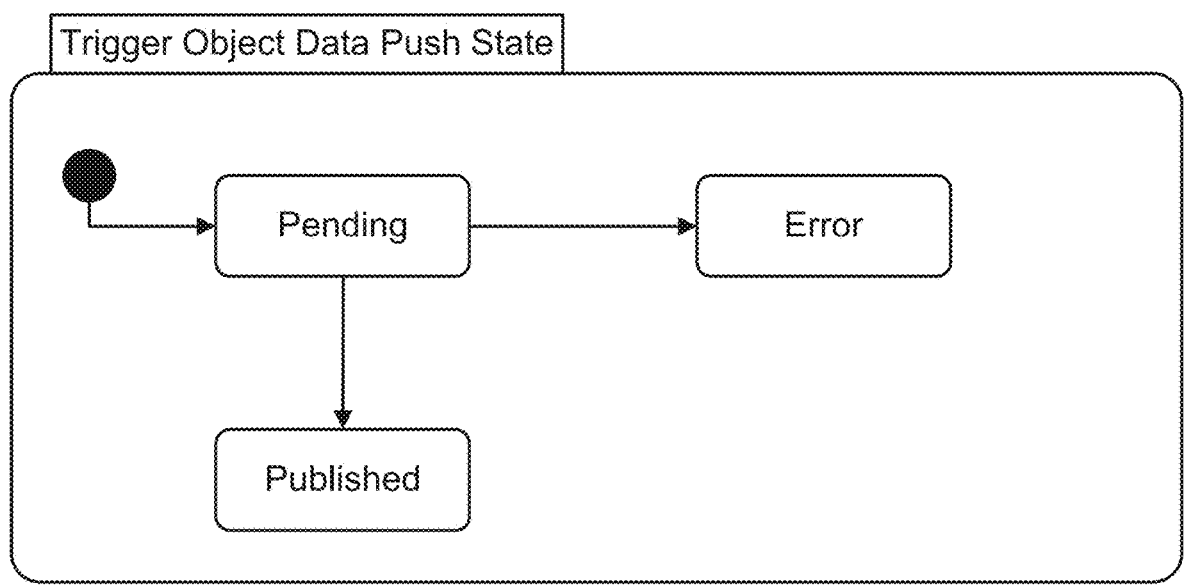
FIG. 3B depicts an example of a state diagram associated with handling a transaction at a source system, in accordance with some example embodiments.
Figure 3C:
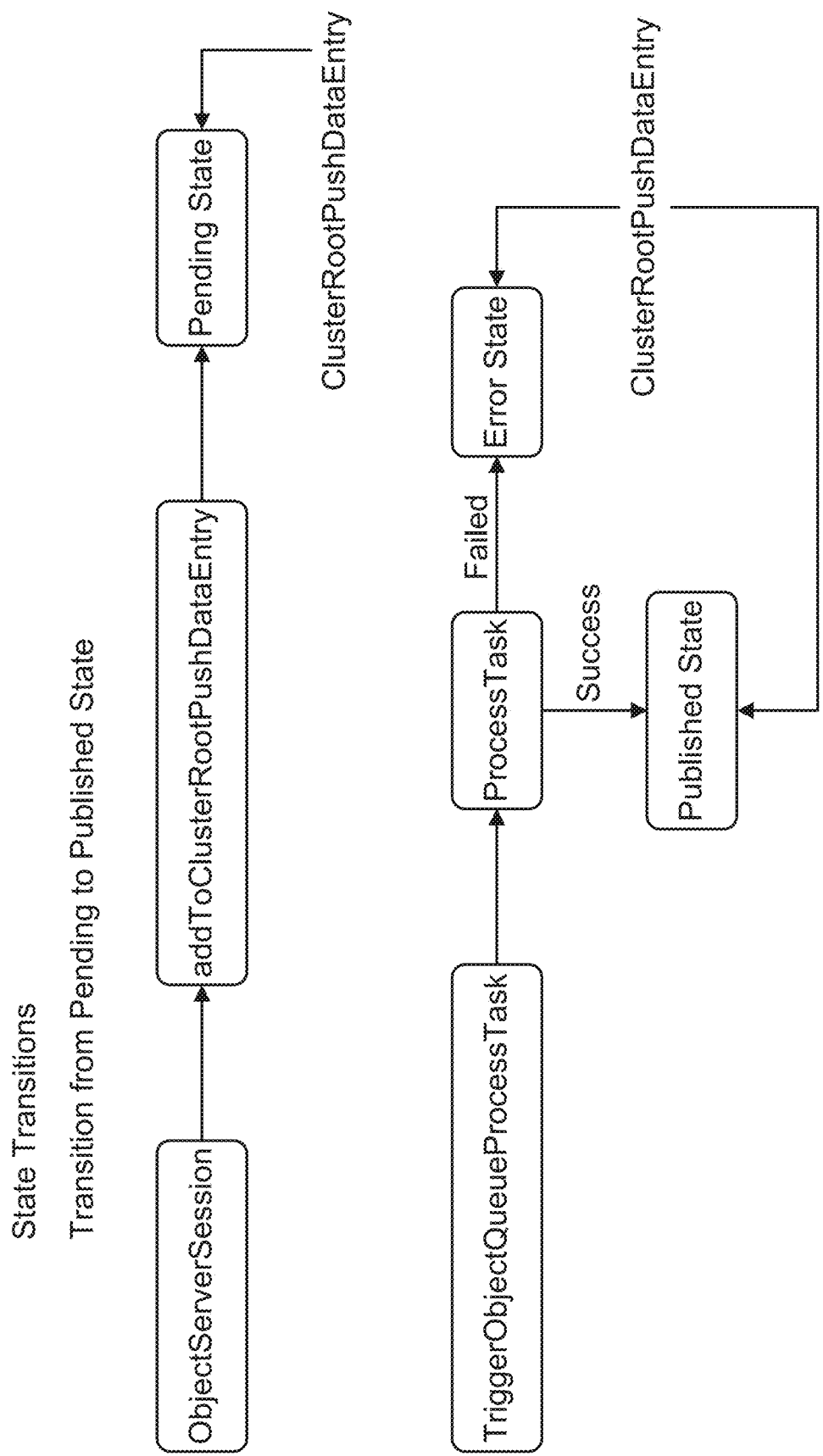
FIG. 3C depicts an example of a state diagram associated with handling a transaction at a source system, in accordance with some example embodiments.

FIG. 3A depicts a schematic diagram illustrating an example of the source system 120, in accordance with some example embodiments. In some example embodiments, the extractor 124 may be a feature that is initiated at a startup of the source system 120. When a transaction is initiated at the source system 120, if one or more datatypes (e.g., cluster roots) affected by the transaction is marked as a trigger object for extraction, an entry may be generated to represent a transition of the transaction from pending to publication. When a transaction is flushed to commit, a corresponding entry may be generated for each of the affected datatypes (that is marked as a trigger object) in a "pending" state. When a datatype (e.g., the trigger object) is committed to the transaction database 126, the corresponding transaction may be added to a queue 316, for example, by a base framework 312. The queue 316 may be bounded, for example, to accept a maximum quantity of transactions. A scheduled task may be executed periodically in order to alleviate any backlogs associated with the queue 316 in which one or more transactions remain in the queue 316 for more than a threshold quantity of time. FIGS. 3B-C depict an example of a state diagram associated with pushing a datatype and the corresponding transition of a transaction from pending to publication. As shown in FIGS. 3B-C, if any error occurs in the execution and/or publication of the transaction, the state of the transition may transition to an "error" state, for example, from a "pending" state.

Figure 3D:
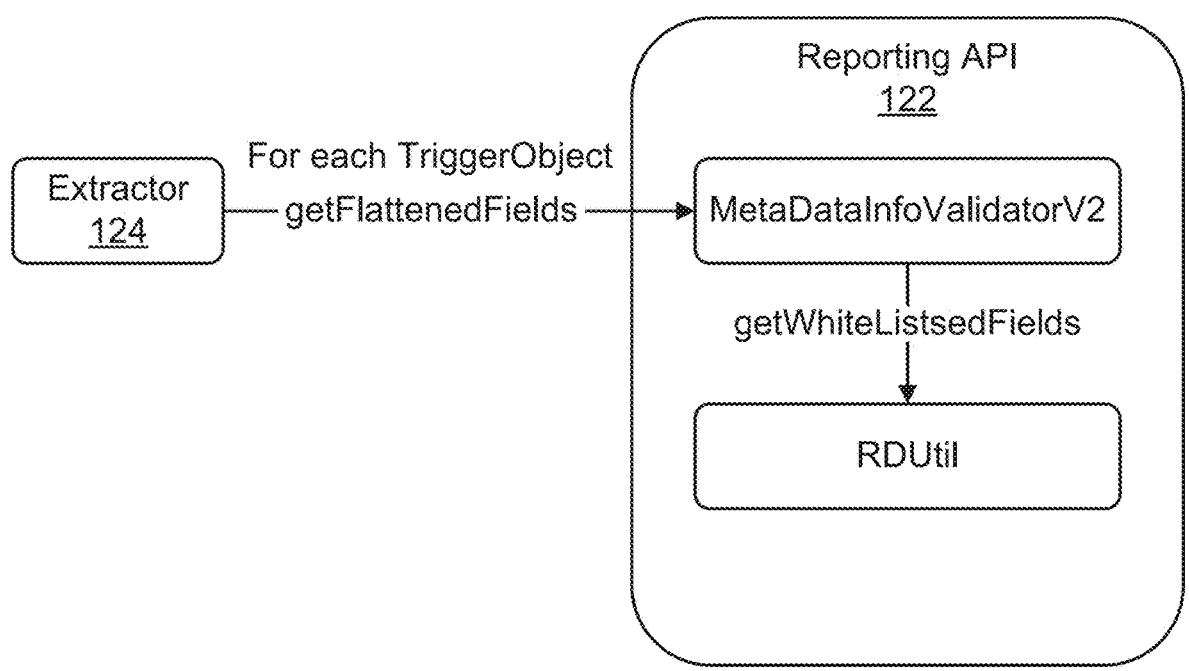
FIG. 3D depicts a schematic diagram illustrating an example of a process for extracting fields forming a data schema of a source system, in accordance with some example embodiments.

In some example embodiments, the reporting application programming interface 122 may extract, from each cluster root, the reportable fields that require publication to the event stream 127. These fields may form the data schema of the source system 120, which may be shared with the target system 130 through the data lake platform 110. FIG. 3D depicts a schematic diagram illustrating the extracting of the fields forming the data schema of the source system 120. For example, the extractor 124 may extract, based on one or more whitelists of reportable fields (or blacklists of non-reportable fields), the reportable fields that require publication to the queue 316. It should be appreciated that the extraction of these fields and the final formatting of the data occupying the fields may be performed based on a hierarchical schema. The output of this extraction may be match the output of the baseline framework 312 also using the same reporting application programming interface 122 in order to avoid duplicate programming code and/or functionality. The same runtime components of the reporting application programming interface 122 may thus be called by the extractor 124 and the baseline framework 312.

Figure 3E:
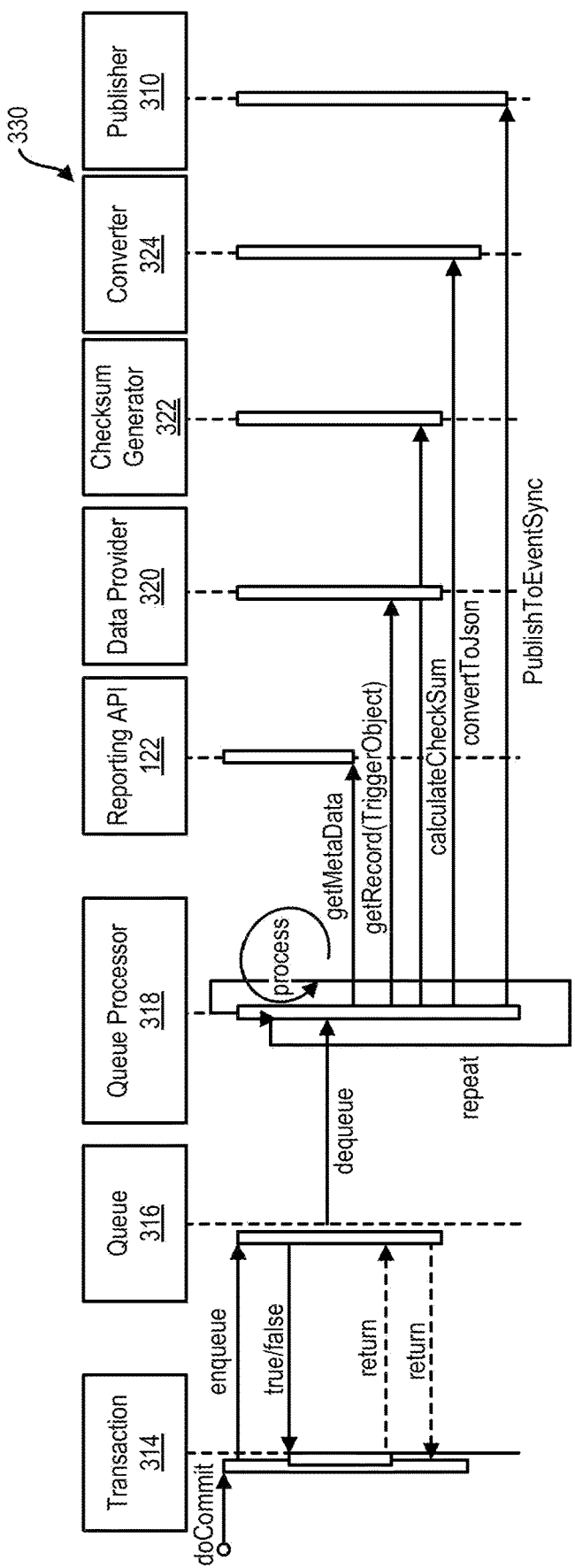
FIG. 3E depicts a sequence diagram illustrating an example of a process for synchronizing metadata between a source system and a data lake platform, in accordance with some example embodiments.

FIG. 3E depicts a sequence diagram illustrating an example of a process 330 for synchronizing the metadata 250 between the source system 120 and the data lake platform 110, in accordance with some example embodiments. Referring to FIG. 3E, a transaction 314 executed at the source system 120 may be added to the queue 316, which may be processed by a queue processor 318. As noted, the queue 316 may be configured to accept a threshold quantity of transactions. Moreover, as shown in FIG. 3E, the queue processor 318 may process the transactions in the queue, including the transaction 314, by generating one or more corresponding packages for the publisher 310 to insert to the event stream 127. For instance, in the example of the process 330 shown in FIG. 3E, the queue processor 318 may call the reporting application programming interface 122 to retrieve the metadata associated with the transaction 314 before calling a data provider 320 to retrieve the reportable fields associated with the transaction 314. The queue processor 318 may call a checksum generator 322, for example, at the source system 120, in order to generate a checksum of the reportable fields, which may be used by the metadata controller 115 (e.g., the metadata sink 118) to detect changes in the reportable fields. To generate a package that the publisher 310 may publish to the event stream 127, the queue processor 318 may call a converter 324 to convert the reportable fields and/or the corresponding checksum to a suitable format such as JavaScript Object Notation (JSON) and/or the like. The package that is published to the event stream 127 may thus include the checksum, which enables the metadata controller 115 to determine whether the data schema of the source system 120 has undergone one or more changes, for example, between the first time $t_1$ and the second time $t_2$. The metadata controller 115 may thus use the checksums to implement version control when the source system 120 lacks a native version control for tracking the changes to the data schema of the source system 120.

Figure 3F:
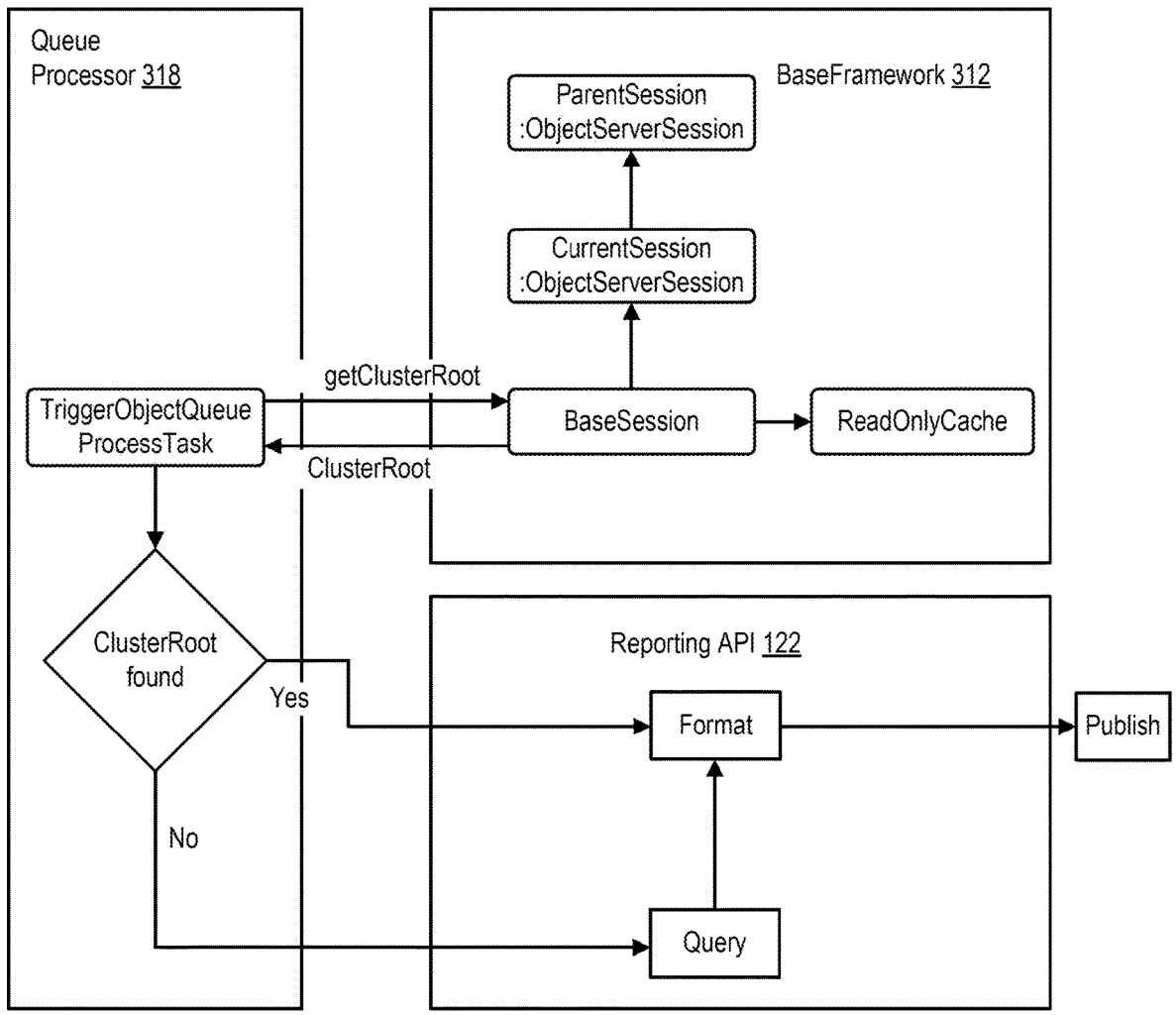
FIG. 3F depicts a block diagram illustrating an interaction between a queue processor, a base framework, and a reporting application programming interface, in accordance with some example embodiments.

FIG. 3F depicts a block diagram illustrating an interaction between the queue processor 318, the base framework 312, and the reporting application programming interface (API) 122. As shown in FIG. 3F, the queue processor 318 may attempt to retrieve a particular datatype from the base framework 312. If the datatype is found by the base framework 312, for example, because the datatype is cached for the session, the queue processor 318 may send the datatype to the reporting application programming interface 122 for formatting by the converter 324. Alternatively, if the datatype is not found by the base framework 312, for example, because the datatype is not cached for the session, the queue processor 318 may request that the reporting application programming interface 122 query another database for the datatype. As shown in FIG. 3F, the reporting application programming interface 122 may publish the formatted data, for example, to the event stream 127.

Figure 3G:
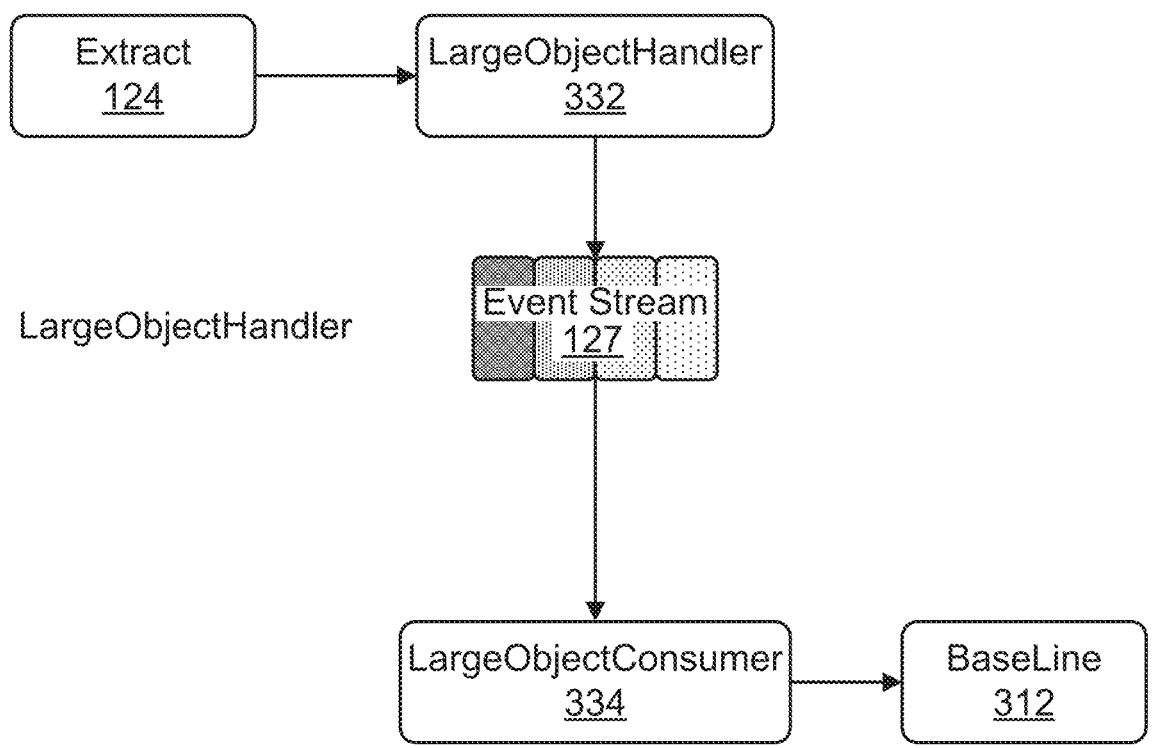
FIG. 3G depicts an example of a workflow associated with large object handling, in accordance with some example embodiments.

In some example embodiments, large objects, which may include objects exceeding a threshold size, may be detected as early as possible to avoid being published to the event stream 127 and overwhelming the capacity of the event stream 127. Instead, a large object handler 332 may be deployed to detect the presence of large objects and to route these large objects to the appropriate consumers. FIG. 3G depicts an example of a workflow associated with large object handling. As shown in FIG. 3G, large objects from the extractor 124 that exceed a threshold size may be published via different topic in the event stream 127. A large object consumer service 334 may listen for the addition of one or more large objects to the event stream 127 and route these large objects to the baseline framework 312 to load the data from the reporting application programming interface 122, convert the data to a column oriented data storage format such as Parquet (or another data storage format), and store it in a cloud-based storage repository.

The large object handling workflow may include imposing a configurable threshold capacity (e.g., 5 MB or another threshold) to the event stream 127, which may be implemented as a byte array output stream (or another type of output stream). When the insertion of packet to the event stream 127 causes the event stream 127 to exceed its threshold capacity, the operation may be aborted and the packet may be published via the large object handler 332 instead. Alternatively, the large object handling workflow may include calculating the size of each packet before the packet is inserted into the event stream 127 or during the generating of each packet. This computation may include an approximation of the primitives, such as strings, included in each packet.

In some example embodiments, changes in the metadata 125 corresponding to the data schema of the source system 120 may be detected based on a checksum. The checksum may be computed based on the reportable fields included in the metadata, which may be identified based on a whitelist of reportable fields (or a blacklist of non-reportable fields). The checksum may be generated by the checksum generator 322 and may be a hash value (e.g., generated by applying a secure hash algorithm, a message digest algorithm, and/or the like) corresponding to the values associated with the reportable fields such as a name, a type, a length, and/or the like. Moreover, the checksum may be saved and used by the metadata controller 115 (e.g., the metadata sink 118) to detect changes in the reportable fields.

Figure 4:
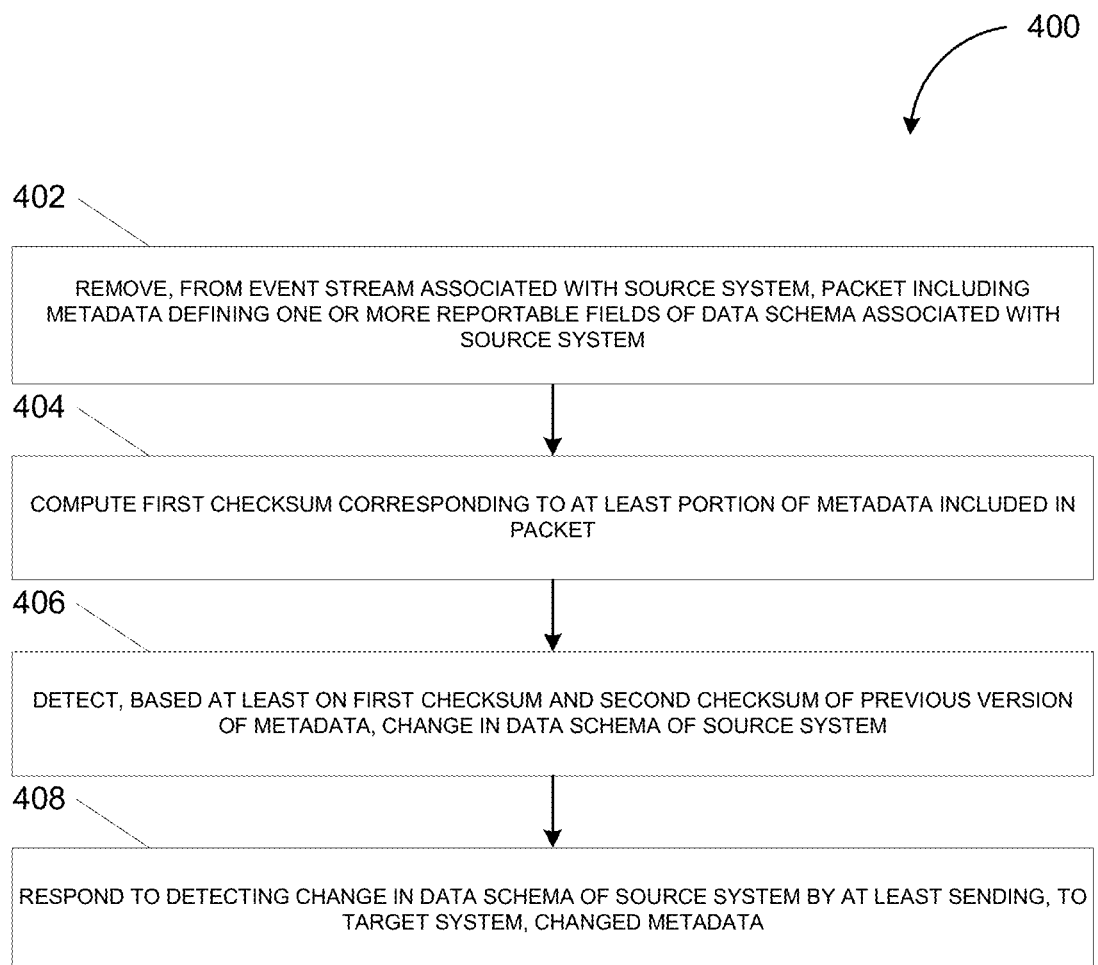
FIG. 4 depicts a flowchart illustrating an example of a process for synchronizing metadata, in accordance with some example embodiments.

FIG. 4 depicts a flowchart illustrating an example of a process 400 for synchronizing metadata, in accordance with some example embodiments. Referring to FIGS. 1A-B, 2A-D, 3A-G, and 4, the process 400 may be performed by the metadata controller 115 in order to synchronize the metadata 125 at least between the source system 120 and the target system 130. This synchronization may be performed at least because the metadata 125, which corresponds to the data schema of the source system 120, may be used at the target system 130 to perform the one or more tasks associated with the application 135.

At 402, the metadata controller 115 may remove, from the event stream 127 associated with the source system 120, a packet including a metadata defining one or more reportable fields of a data schema associated with the source system 120. For example, the source system 120 may be configured to detect when one or more transactions at the source system 120 affect one or more reportable fields of a datatype at the source system 120. Data at the source system 120 may be organized in accordance to a schema defining various datatypes and the relationships that may exist between two or more different datatypes. Each datatype may be formed by one or more fields, with the data schema of the source system 120 further specifying the quantity, type, and contents of the fields forming each datatype. A reportable field in this context may be a field that is required for reporting for a particular datatype as preconfigured in a markup language of the source system 120. One or more transactions at the source system 120 may affect a reportable field including, for example, by adding a reportable field, deleting a reportable field, and/or modifying a reportable field (e.g., changing the name, datatype, length, and/or the like of the field).

At 404, the metadata controller 115 may compute a first checksum corresponding to at least a portion of the metadata included in the packet. In some example embodiments, the metadata controller 115 may compute a checksum corresponding to the metadata by at least determining a hash value, for example, by applying a secure hash algorithm (SHA), a message digest (MD) algorithm, and/or the like. The checksum may thus be a value that is representative of the content of the metadata and may change when the content of the metadata undergoes one or more changes.

At 406, the metadata controller 115 may detect, based at least on the first checksum and a second checksum corresponding to a previous version of the metadata, a change in the data schema of the source system 120. For example, the metadata controller 115 may determine, based at least on a first checksum of the metadata 125 from the first time $t_1$ and a second checksum of the metadata 125 from the second time $t_2$, that the data schema of the source system 120 has undergone one or more changes between the first time $t_1$ and the second time $t_2$. As noted, the first checksum and the second checksum may be computed based on the metadata 125 including, for example, the values associated with the description, type, length, and/or the like of each field included in the metadata 125. Thus, changes to the metadata 125, including the addition, deletion, and/or modification of one or more fields included in the metadata 125, may result in a corresponding change in the checksum computed based on the metadata 125.

At 408, the metadata controller 115 may respond to detecting the change in the data schema of the source system 120 by at least sending, to the target system 130, the changed metadata. In some example embodiments, the metadata controller 115 may send the metadata 125 (or the changed portions of the metadata 125) to the raw store 113 where the metadata may be held until the metadata 125 undergoes an extract, transform, and load (ETL) process for sharing the metadata 125 with the target system 130. As noted, the changed metadata may be shared with the target system 130 in order for the target system 130 to perform one or more tasks associated with the application 135 including, for example, reporting, visualization, advanced analytics, machine learning, and/or the like.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving, at a data lake platform, a packet including a metadata corresponding to a data schema of a source system; detecting, based at least on a first checksum of the metadata and a second checksum of a previous version of the metadata, a change in the data schema of the source system; and in response to detecting the change in the data schema of the source system, sending the metadata to a target system to enable the target system to perform, based at least on the data schema of the source system, a task operating on a data from the source system.

Example 2: The system of example 1, wherein the data from the source system is associated with at least one datatype, and wherein the data schema defines a quantity and a content of fields forming the at least one datatype.

Example 3: The system of any one of examples 1 to 2, further comprising: computing the first checksum and the second checksum by at least applying, to a value associated with one or more fields of the at least one datatype, a hash algorithm.

Example 4: The system of example 3, wherein the value comprises a name, a type, and/or a length of the one or more fields.

Example 5: The system of any one of examples 3 to 4, wherein the one or more fields comprise one or more reportable fields preconfigured in a markup language of the source system.

Example 6: The system of example 5, wherein the one or more reportable fields are identified by a whitelist of reportable fields and/or a blacklist of non-reportable fields.

Example 7: The system of any one of examples 1 to 6, wherein the previous version of the metadata comprises a historical data from prior to an onboarding of a tenant associated with the metadata.

Example 8: The system of any one of examples 1 to 7, wherein the source system is associated with an event stream providing a constant flow of the data from the source system, and wherein the packet is received by at least removing the packet from the event stream.

Example 9: The system of any one of examples 1 to 8, wherein the metadata is stored in a raw data store and undergoes an extract, transform, and load process in order to be sent to the target system.

Example 10: The system of any one of examples 1 to 9, wherein the task at the target system includes reporting, visualization, advanced analytics, and/or machine learning.

Example 11: A computer-implemented method, comprising: receiving, at a data lake platform, a packet including a metadata corresponding to a data schema of a source system; detecting, based at least on a first checksum of the metadata and a second checksum of a previous version of the metadata, a change in the data schema of the source system; and in response to detecting the change in the data schema of the source system, sending the metadata to a target system to enable the target system to perform, based at least on the data schema of the source system, a task operating on a data from the source system.

Example 12: The method of example 11, wherein the data from the source system is associated with at least one datatype, and wherein the data schema defines a quantity and a content of fields forming the at least one datatype.

Example 13: The method of any one of examples 11 to 12, further comprising: computing the first checksum and the second checksum by at least applying, to a value associated with one or more fields of the at least one datatype, a hash algorithm.

Example 14: The method of example 13, wherein the value comprises a name, a type, and/or a length of the one or more fields.

Example 15: The method of any one of examples 13 to 14, wherein the one or more fields comprise one or more reportable fields preconfigured in a markup language of the source system.

Example 16: The method of example 15, wherein the one or more reportable fields are identified by a whitelist of reportable fields and/or a blacklist of non-reportable fields.

Example 17: The method of any one of examples 11 to 16, wherein the previous version of the metadata comprises a historical data from prior to an onboarding of a tenant associated with the metadata.

Example 18: The method of any one of examples 11 to 17, wherein the source system is associated with an event stream providing a constant flow of the data from the source system, and wherein the packet is received by at least removing the packet from the event stream.

Example 19: The method of any one of examples 11 to 18, wherein the metadata is stored in a raw data store and undergoes an extract, transform, and load process in order to be sent to the target system.

Example 20: A non-transitory computer readable medium storing instructions, which when executed by at least one data processor, result in operations comprising: receiving, at a data lake platform, a packet including a metadata corresponding to a data schema of a source system; detecting, based at least on a first checksum of the metadata and a second checksum of a previous version of the metadata, a change in the data schema of the source system; and in response to detecting the change in the data schema of the source system, sending the metadata to a target system to enable the target system to perform, based at least on the data schema of the source system, a task operating on a data from the source system.

FIG. 5 depicts a block diagram illustrating a computing system 500, in accordance with some example embodiments. Referring to FIGS. 1 and 5, the computing system 500 can be used to implement the metadata controller 115 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the metadata controller 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
at least one processor; and
at least one memory including program code which when executed by the at least one processor provides operations comprising:
receiving, at a data lake platform, a packet including a metadata corresponding to a data schema of a source system, wherein the metadata defines one or more reportable fields of the data schema of the source system;
using checksums to implement version control for the data schema of the source system in response to the source system lacking a native version control for tracking changes to the data schema of the source system;
computing a first checksum of the one or more reportable fields of the metadata based on the one or more reportable fields of the metadata being in a first format;
converting the one or more reportable fields of the metadata and the first checksum to a second format based on a hierarchical schema;
detecting, based at least on a first checksum of the one or more reportable fields of the metadata in the second format and a second checksum of one or more reportable fields of a previous version of the metadata, a change in the data schema of the source system, wherein each reportable field of the one or more reportable fields is a field that is required for reporting for a particular datatype, and wherein the previous version of the metadata comprises a historical data from prior to an onboarding of a tenant associated with the metadata;
upon onboarding the tenant, acquiring one or more historical records associated with the particular datatype specified for reporting; and
in response to detecting the change in the data schema of the source system, sending the metadata to a target system to enable the target system to perform, based at least on the data schema of the source system, a task operating on a data from the source system, wherein the source system and the target system have disparate data schemas.

2. The system of claim 1, wherein the data from the source system is associated with at least one datatype, and wherein the data schema defines a quantity and a content of fields forming the at least one datatype.

3. The system of claim 2, further comprising:
computing the first checksum and the second checksum by at least applying, to a value associated with one or more fields of the at least one datatype, a hash algorithm.

4. The system of claim 3, wherein the value comprises a name, a type, and/or a length of the one or more fields.

5. The system of claim 1, wherein the operations further comprise:
sending the one or more reportable fields of the metadata to the data lake platform by inserting the one or more reportable fields in an event stream;
pushing a below-threshold quantity of events to the event stream;
holding, by the event stream, events that are processed in real time as the events are delivered to the target system; and
consuming events by listening for an addition of events to the event stream and synchronizing contents of the event stream with a raw data store.

6. The system of claim 5, wherein the operations further comprise:
monitoring an event consumption rate and a backlog rate in order to prevent excessive lag time; and
raising an alert to trigger a scaling of resources at the data lake platform if an event consumption rate and a backlog rate fail to meet one or more thresholds.

7. The system of claim 1, wherein the operations further comprise:
pulling the one or more historical records in one or more batches; and
writing the one or more batches to a raw data store based on a partition strategy at the raw data store.

8. The system of claim 1, wherein the source system is associated with an event stream providing a constant flow of the data from the source system, and wherein the packet is received by at least removing the packet from the event stream.

9. The system of claim 1, wherein the metadata is stored in a raw data store and undergoes an extract, transform, and load process in order to be sent to the target system.

10. The system of claim 1, wherein the task at the target system includes reporting, visualization, advanced analytics, and/or machine learning.

11. A computer-implemented method, comprising:
receiving, at a data lake platform, a packet including a metadata corresponding to a data schema of a source system, wherein the metadata defines one or more reportable fields of the data schema of the source system;
using checksums to implement version control for the data schema of the source system in response to the source system lacking a native version control for tracking changes to the data schema of the source system;
computing a first checksum of the one or more reportable fields of the metadata based on the one or more reportable fields of the metadata being in a first format;
converting the one or more reportable fields of the metadata and the first checksum to a second format based on a hierarchical schema;
detecting, based at least on a first checksum of the one or more reportable fields of the metadata in the second format and a second checksum of one or more reportable fields of a previous version of the metadata, a change in the data schema of the source system, wherein each reportable field of the one or more reportable fields is a field that is required for reporting for a particular datatype, and wherein the previous version of the metadata comprises a historical data from prior to an onboarding of a tenant associated with the metadata;
upon onboarding the tenant, acquiring one or more historical records associated with the particular datatype specified for reporting; and
in response to detecting the change in the data schema of the source system, sending the metadata to a target system to enable the target system to perform, based at least on the data schema of the source system, a task operating on a data from the source system, wherein the source system and the target system have disparate data schemas.

12. The method of claim 11, wherein the data from the source system is associated with at least one datatype, and wherein the data schema defines a quantity and a content of fields forming the at least one datatype.

13. The method of claim 12, further comprising:
computing the first checksum and the second checksum by at least applying, to a value associated with one or more fields of the at least one datatype, a hash algorithm.

14. The method of claim 13, wherein the value comprises a name, a type, and/or a length of the one or more fields.

15. The method of claim 11, further comprising:
sending the one or more reportable fields of the metadata to the data lake platform by inserting the one or more reportable fields in an event stream;
pushing a below-threshold quantity of events to the event stream;
holding, by the event stream, events that are processed in real time as the events are delivered to the target system; and
consuming events by listening for an addition of events to the event stream and synchronizing contents of the event stream with a raw data store.

16. The method of claim 15, further comprising:
monitoring an event consumption rate and a backlog rate in order to prevent excessive lag time; and
raising an alert to trigger a scaling of resources at the data lake platform if an event consumption rate and a backlog rate fail to meet one or more thresholds.

17. The method of claim 11, further comprising
pulling the one or more historical records in one or more batches; and
writing the one or more batches to a raw data store based on a partition strategy at the raw data store.

18. The method of claim 11, wherein the source system is associated with an event stream providing a constant flow of the data from the source system, and wherein the packet is received by at least removing the packet from the event stream.

19. The method of claim 11, wherein the metadata is stored in a raw data store and undergoes an extract, transform, and load process in order to be sent to the target system.

20. A non-transitory computer readable medium storing instructions, which when executed by at least one data processor, result in operations comprising:
receiving, at a data lake platform, a packet including a metadata corresponding to a data schema of a source system, wherein the metadata defines one or more reportable fields of the data schema of the source system;
using checksums to implement version control for the data schema of the source system in response to the source system lacking a native version control for tracking changes to the data schema of the source system;
computing a first checksum of the one or more reportable fields of the metadata based on the one or more reportable fields of the metadata being in a first format;
converting the one or more reportable fields of the metadata and the first checksum to a second format based on a hierarchical schema;
detecting, based at least on a first checksum of the one or more reportable fields of the metadata in the second format and a second checksum of one or more reportable fields of a previous version of the metadata, a change in the data schema of the source system, wherein each reportable field of the one or more reportable fields is a field that is required for reporting for a particular datatype, and wherein the previous version of the metadata comprises a historical data from prior to an onboarding of a tenant associated with the metadata;
upon onboarding the tenant, acquiring one or more historical records associated with the particular datatype specified for reporting; and
in response to detecting the change in the data schema of the source system, sending the metadata to a target system to enable the target system to perform, based at least on the data schema of the source system, a task operating on a data from the source system, wherein the source system and the target system have disparate data schemas.

* * * * *